Jan. 8, 1935.    O. U. ZERK    1,987,093
SHAFT BEARING
Filed April 12, 1932
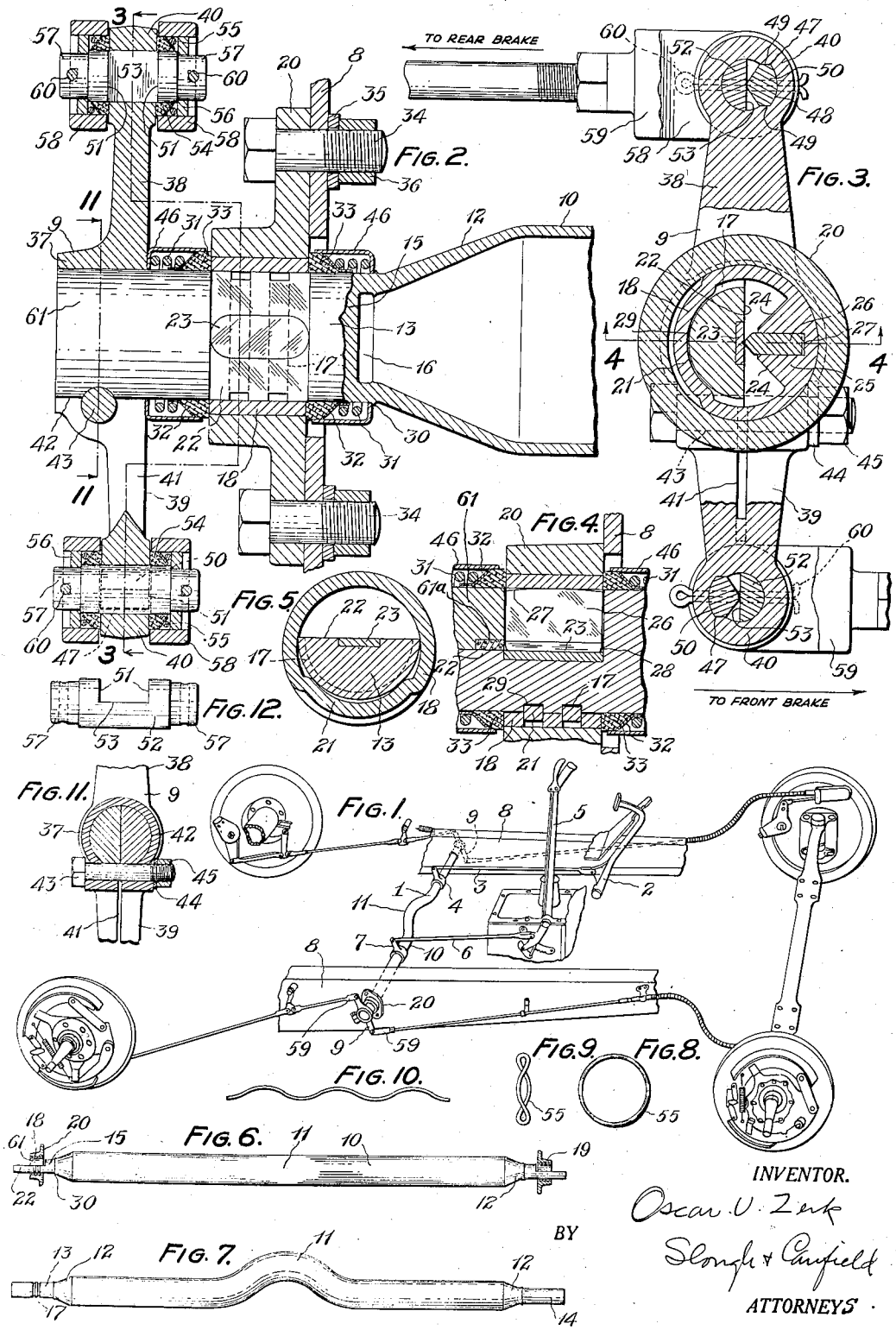
INVENTOR.
Oscar U. Zerk
BY
Slough & Canfield
ATTORNEYS Patented Jan. 8, 1935

1,987,093

UNITED STATES PATENT OFFICE 1,987,093

SHAFT BEARING

Oscar U. Zerk, Cleveland, Ohio

Application April 12, 1932, Serial No. 604,771

12 Claims. (Cl. 308—21)

My invention relates to rock shafts and the like devices in which rotary motion imparted to the shaft is transformed to an oscillating or reciprocating motion through the medium of levers, bell cranks and the like secured to the said shaft, and relates particularly to an improved bearing mechanism for mounting the said shaft and transmitting the oscillating or reciprocatory movement in a relatively non-frictional manner.

A principal object of my invention is to provide an improved manner of mounting a rock shaft and associated parts, whereby rotary movement of the shaft and relative movement of the interconnecting or hinging parts may be accomplished without the introduction of objectionable friction between the relatively movable parts, even though little or no lubricant is applied to the bearing surfaces of the parts.

Another object of my invention is to provide an improved rock shaft or the like, wherein the bearing elements thereof are effectively sealed against the entry of foreign substances, such as grit and dirt, and which is susceptible of relatively non-frictional operation.

Another object of my invention is to provide an improved rock shaft or the like adapted to transmit a reciprocating or oscillatory motion to associated parts, wherein a means preventing objectionable lateral movement of the related parts is provided.

Another object of my invention is to provide an improved rock shaft or the like, wherein a limited relative universal movement is permitted between the shaft and the mountings therefor.

Another object of my invention is to provide an improved rock shaft mechanism, the parts of which are susceptible of being easily and inexpensively manufactured and which may be easily and efficiently assembled.

Another object of my invention is to provide an improved rock shaft or the like, wherein knife edge type bearings are employed between the relatively moving parts.

Another object of my invention is to provide an improved rock shaft or the like, the associated levers of which are provided with knife edge type bearings and improved means for sealing the same against the entry of foreign materials to the bearing surfaces.

Another object of my invention is to provide in an improved rock shaft or the like, a knife edge type bearing wherein means are provided within the bearing housing for preventing objectionable lateral movement of the related parts.

Another object of my invention is to provide an improved rock shaft or the like, employing a knife edge type bearing wherein the knife edge elements are formed of parts of rustless or stainless chromium steel.

Another object of my invention is to provide an improved means of forming a shaft wherein the ends thereof will be in axial alignment irrespective of the shape of the intermediate portion of the shaft.

Other objects of my invention and the invention itself will be more apparent to those skilled in the art to which my invention appertains by reference to the following description of certain embodiments of my invention which are illustrated in the accompanying drawing, wherein—

Referring to the drawing—

Fig. 1 is a fragmentary perspective view of the brake mechanism of an automobile which is of the 4 wheel mechanical type, wherein the brake cross shaft embodies my invention;

Fig. 2 is an enlarged, vertical, sectional view of one end of the brake cross shaft, and associated parts;

Fig. 3 is a side elevational view, partially in sections of the brake cross shaft, taken along the line 3—3 of Fig. 2;

Fig. 4 is a fragmentary sectional view taken along the line 4—4 of Fig. 3 and illustrating a knife edge bearing;

Fig. 5 is a view showing the manner of assembling the shaft end in recessed bushings;

Fig. 6 is a plan view of the cross shaft showing an interlocked bearing housing at one end of the shaft whereby relative lateral movement is limited, and a bearing housing at the opposite end not so interlocked;

Fig. 7 is an elevational view of the cross shaft of Fig. 6 illustrating the way it is bent to clear the torque shaft;

Fig. 8 is an elevational view of a spring employed in the brake lever end bearing;

Fig. 9 is a side elevational view of the spring illustrated in Fig. 8;

Fig. 10 is a view of the spring illustrated in Figs. 8 and 9 before the ends are secured together;

Fig. 11 is a fragmentary, sectional view taken along the line 11—11 of Fig. 2 showing the manner of securing the brake lever to the cross shaft end,—and Fig. 12 is a view of the bearing pins used in the brake lever ends.

Referring to Fig. 1, the brake cross shaft generally indicated at 1, may be actuated either by the foot pedal 2 which is connected thereto by a rod 3 and the integrally secured lever 4, or it may be actuated by a hand lever 5, which is connected by means of a rod 6 and the integrally secured rock lever 7. The cross shaft is journaled in the side sills 8 of the car and adjacent each end of the shaft in a manner to be hereinafter described.

Brake levers 9 secured to the ends of the cross shaft internally actuate the front and rear wheel brake mechanism.

The cross shaft 1, best illustrated in Figs. 2, 6, and 7 comprises a tubular element 10 bent to a generally semi-circular shape at the central portion thereof as indicated at 11 to provide a clearance for the torque shaft converging at the ends as indicated at 12 to substantially the diameter of the end elements 13 and 14 to which it is secured preferably by butt welding. The end elements 13 and 14 are cylindrical adjacent the element 10 and substantially semi-cylindrical in the remaining portion. The cylindrical portion of elements 13 and 14 generally indicated at 15 is preferably provided with a recessed end 16, to ensure a solid weld between the end elements and the central element 10.

During the welding operation the end elements 13 and 14 are maintained in axial alignment thereby ensuring that the cross shaft will always be properly journaled irrespective of any irregularity in the shape of the bent tubular element 10. The end elements 13 and 14 are generally similar with the exception that the element 13 is provided with transverse grooves 17 for a purpose to be hereinafter described.

Bushings 18 and 19 are rigidly secured within an aperture provided therefor in a generally oval shaped bracket 20, preferably by press-fitting. The bushings 18 and 19 are generally similar with the exception that bushing 18 is provided with arcuate ridges at 21 complementary to the recesses 17 provided in end element 13 of the cross shaft. These ridges, as is most clearly illustrated in Fig. 4, are formed by depressing spaced portions of the bushing wall inwardly for substantially one-third of the periphery. In order to seat the ridges 21 intermediate the recesses 17 of the end element 13 it is necessary that the semi-cylindrical ends be moved vertically above the horizontal diametrical plane of the bushing a distance slightly greater than the raised portion of the bushing, and the diameter of the semi-cylindrical ends is decreased relative to the interior diameter of the bushing sufficiently to accomplish this.

When seated the end bearing surface generally indicated at 22, will be substantially in the diametrical plane of the bushing. The elements 13 and 14 are preferably formed of relatively soft non-alloy steel and are provided with centrally disposed recesses within which are inserted, preferably oval shaped hardened bearing plates 23. The interior wall of the bushing is generally circular for approximately three-quarters of its periphery, and the remainder comprises the ridge faces 24 of a sector shaped integral portion 25. The sector 25 of the bushings is provided with a longitudinally extending, radial slot within which is movably disposed a knife edge bearing element 26. As is best illustrated in Fig. 4, the knife edge element 26 is curved along an end 27 whereby it will be permitted a limited rocking motion relative to the bushings.

The ends of the knife edge are preferably beveled as indicated at 28 to minimize the abrasive tendency which might otherwise be caused if a sharp corner were in contact with the bearing plate 23. The knife edge element 26 is held in place intermediate the semi-circular faces of the pins 13 and 14 and the semi-circular face of a semi-cylindrical closure element 61 which is matched with the semi-cylindrical portion of the end element to form a cylinder. Inasmuch as the knife edge element 26 is held in bearing engagement with the bearing plate 23 any relative longitudinally rocking movement will be between the bushing and the knife edge of the pin but not between the pin and the knife edge element.

To accommodate the relative vertical action resulting from this longitudinally rocking movement a slight clearance is provided between the ridges 21 and the bushing wall and the recesses 17 in the shaft end, as indicated at 29. Therefore, the pin and knife edge will tend to fulcrum about the ridges 21. Therefore, a limited universal movement is permitted of the shaft 1 in utilizing this type bearing.

In assembling the mechanism a cup shaped preferably sheet metal element 46 provided with a centrally disposed aperture in the bottom thereof is placed over the shaft end with the bottom thereof abutting the ridge weld indicated at 30. A normally compressed spring 31 is disposed within the cup and seats against a preferably sheet metal frusto-conical shaped ring 32 which in turn engages a conforming shape packing ring 33. The shaft ends are then seated within the bushings provided in bracket 20 as previously described, the brackets being provided with apertures whereby the bracket may be rigidly secured to the side sills 8 by a bolt 34, lock washer 35, and nut 36.

Packing rings 32, spring 31 and cup elements 30 are oppositely disposed at the outboard end of the bearing the bottom of the cup abutting the brake lever arm 9. Since the packing rings 33 are wedgingly secured against the shaft end and the bushings, the bearing is very effectively sealed against the entry of grit or other foreign substance which might tend to cause an abrasive action between the bearing elements.

The manner of securing the brake lever 9 to the pin ends is best illustrated at Fig. 11. The brake lever generally indicated at 9 comprises a central hub portion 37 and the integral arms 38 and 39, each of said arms being provided with a head 40, the arm 39 having a transverse slot 41 therein extending from an annular bore 42 provided in the flange portion 37 to a point adjacent head 40. The slot 41 permits of the bore 42 being sufficiently expanded to spring the lever 9 over the shaft end and to be clamped thereon by means of a bolt 43, lock washer 44, and nut 45. The bolt 43 is disposed in aligned apertures provided in the portion 37 of the brake lever and also engages a groove provided therefor in the pin end.

It will thus be observed that the semi-cylindrical shaft end and the matched semi-cylindrical element 61 are clamped tightly together preventing the entry of any foreign material between the engaged faces. It will be further noted that the brake lever 9 is prevented from moving either laterally or rotatively relative to the shaft 1. The semi-cylindrical element 61 is provided with a preferably cork sealing element 61A extending transversely of the element 61 and compressively engaging surface 22 of the shaft ends.

Knife edge bearings are provided in the head 40 to accommodate the oscillating motion relative to the brake lever of the rod transmitting the braking action to the front and rear brakes. The head 40 is provided with an aperture which is cylindrical for substantially three-quarters of its periphery and is recessed as indicated at 47 in the remaining portion. This recess is defined by the concentric arcuate portion 48 and the preferably parallel faced portions 49. A knife edge sector 50 indicated in cross sections Fig. 3, is secured within the recess 47 with the knife edge thereof lying substantially in the axis of the head.

Prior to inserting the knife edge sector 50 in the head it is disposed intermediate the faces 51 of a pin 52 which is generally cylindrical and is cut away as indicated in Fig. 12 to provide the faces 51 and bearing surface 53. Preferably frusto-conical shaped packing rings 54 are then placed on each side of head 40 and are held in spring pressed relation thereagainst by a serpentine shaped spring 55, preferably having a sheet metal, frusto-conical shaped ring intermediate the packing washers and spring. The outer face of the spring abuts a washer 56 which is disposed over a reduced end 57 of the pin. The packing ring 54 and associated elements are housed in aligned apertures provided therefor in forks 58 of a clevis element 59. The forks 58 are secured to the pin 52 by cotter keys 60 disposed in apertures provided therefor and engaging diametrically disposed recesses in the outer faces of the forks whereby the clevis element 59 and a pin are held in non-rotative relationship.

A similar construction is employed in mounting the rod actuating the front brake to the lever arm 89.

As illustrated in Figures 8, 9 and 10, the spring 55 is formed of suitable wire bent to the shape illustrated in Fig. 2 and then bent to a circular shape and the ends secured together preferably by butt-welding, thus providing a spring which requires relatively little space laterally of the pin and yet exerts sufficient compressive force.

Another advantage of such a type spring is that it abuts the packing ring at spaced points, and the washer at intermediately spaced points, thereby exerting a substantially balanced force upon the packing ring.

By employing the bearing structure as described wherein the bearing elements are composed of parts of stainless or rustless chromium steel inserted in relatively inexpensive and softer preferably non-alloy steel and which does not require lubrication or requires relatively little lubrication, due to the knife edge construction, a considerable economy is effected, both in the construction and in the operation of the braking mechanism. It will be observed that the means for constraining the lateral movement of the shaft relative to the bearing is placed within the bearing sealing means, and is also controlled only by one bearing rather than two or more.

By employing such a construction there is no tendency toward a binding action as might occur if the lateral movement were controlled from two spaced points due to a leverage action which might be exerted therebetween.

By employing a tubular shaft relatively increased in diameter intermediate the ends sufficient strength is obtained to transmit the rocking action, without requiring bearings other than at the ends.

Although I have shown and described the bearing surface as being in the pin end and the knife edge element being disposed in the encircling bushing, it is understood that the reverse procedure may be effected and the knife edge element disposed in a pin end and the bearing surface formed in the encircling bushing.

Having shown and described an embodiment of my invention I contemplate that numerous and extensive departures may be made therefrom without departing from the spirit of my invention and the appended claims.

Having thus described my invention, what I claim is:

1. A rock shaft mechanism comprising a shaft provided with a plurality of spaced bearing surfaces disposed substantially axially of the shaft, a corresponding plurality of bushings encircling said bearing surfaces and provided each with a knife edge bearing element adapted to engage said bearing surfaces along a common line of contact substantially at the shaft axis, the shaft projecting through the bushings, mutually interengaging means being provided on a bushing and the shaft whereby relative lateral movement therebetween longitudinally of the shaft may be limited, annular packing elements wedgingly engaging portions of the shaft and against the bushing ends whereby the bearing elements are sealed against the entry of foreign substances.

2. A rock shaft mechanism comprising a generally tubular shaft, relatively reduced shaft ends comprising a cylindrical portion secured to the tubular portion preferably by butt welding and a substantially semi-cylindrical portion, the shaft ends being similarly disposed and axially aligned, a bracket rigidly mounted, a bushing integrally secured to said bracket and encircling a portion of a semi-cylindrical shaft end, and provided with a slotted sector-shape portion, a knife edge element having sector-form ridges meshed with and rockingly engaging said slotted portion and engaging the semi-cylindrical surface substantially axially thereof, an element abutting the bushing face and completing a part of the semi-cylindrical portion, packing elements encircling the shaft end and abutting the faces of the said bushing.

3. A rock shaft and lever means affixed thereto, and moving therewith when said shaft is rocked, bearings and supporting means therefor at the ends of the shaft, and means associated with a supporting means at only one end of the shaft for restraining longitudinal movements of the shaft comprising peripheral ribs of the shaft substantially concentric with the bearing axis indentured freely within grooves of said supporting means, said bearings being of substantially the so-called knife edge type comprising two bearing elements, one having a bearing edge in contact with a bearing surface of the other and the bearing elements and ribs and grooves formed to permit oscillatory movement of the shaft relative to the supporting means on an axis at an angle to the knife edge of the bearing.

4. A rock shaft and lever means affixed thereto, and moving therewith when said shaft is rocked, bearings and supporting means therefor at the ends of the shaft, and means associated with a supporting means at only one end of the shaft for restraining longitudinal movements of the shaft comprising ribs of said supporting means indentured within peripheral grooves of said shaft, said bearings being of substantially the so-called knife edge type comprising two bearing elements, having knife edge bearing contact with each other and two of the elements of the bearings having fixed longitudinally spaced relation to each other and the mating bearing elements movable on the supporting means to maintain registration with the said relatively fixed elements.

5. A rock shaft mechanism comprising a bearing housing, a rock shaft having an end portion projecting through the housing, a pair of cooperating knife edge bearing elements on the housing and shaft respectively for rockingly supporting the shaft on a knife edge bearing line of contact, means associated with the housing preventing axial movement of the shaft therein and means preventing axial shifting of the knife edge bearing elements relative to the housing, and the knife edge bearing elements formed to permit oscillatory movement of the shaft relative to the housing around an axis at an angle to the knife edge of the bearing.

6. A rock shaft mechanism comprising a pair of bearing housings, a rock shaft having opposite end portions projected through the housings, a pair of cooperating knife edge bearing elements, one on each housing and one on the shaft in each housing, for rockingly supporting the shaft on a knife edge bearing line of contact in the housings, means associated with one housing preventing axial movement of the shaft relative to both housings, and separate means preventing axial shifting of the knife edge bearing elements of each housing relative thereto, and the knife edge bearing elements being formed to permit oscillatory movement of the shaft relative to the housings around an axis at an angle to the knife edge of either bearing.

7. A rock shaft mechanism comprising a bearing housing, a rock shaft having an end portion projecting through the housing, a pair of cooperating knife edge bearing elements on the housing and shaft respectively for rockingly supporting the shaft on a knife edge bearing line of contact, means associated with the housing preventing axial movement of the shaft therein and means preventing axial shifting of the knife edge bearing elements relative to the housing, and the shaft end portion provided with cylindrical portions adjacent opposite side portions of the housing, and sealing means engaging the cylindrical portions and the housing side portions and sealing the shaft in the housing.

8. A rock shaft mechanism comprising a pair of bearing housings, a rock shaft having opposite end portions projected through the housings, a pair of cooperating knife edge bearing elements, one on each housing and one on the shaft in each housing, for rockingly supporting the shaft on a knife edge bearing line of contact in the housings, means associated with one housing preventing axial movement of the shaft relative to both housings, and separate means preventing axial shifting of the knife edge bearing elements of each housing relative thereto, the shaft end portions provided with cylindrical portions adjacent the side portions of each housing and sealing means engaging the cylindrical end portions and the respective housing side portions sealing the shaft and the housings.

9. Bearing means for a rock shaft mechanism comprising a shaft provided with a plurality of spaced bearing surfaces disposed substantially axially of the shaft, each of said bearing surfaces being provided with a supporting member and having a knife edge bearing element adapted to engage said bearing surface along a line of contact substantially at the shaft axis, the shaft projecting through said supporting member, one of said supporting members being provided with means adapted to engage cooperating means on the shaft whereby longitudinal movement of the shaft and the member relative to each other is prevented, this means being disposed intermediate the ends of the bearing surface associated with said supporting member.

10. Bearing means for a rock shaft mechanism comprising a shaft provided with a plurality of spaced bearing surfaces disposed substantially axially of the shaft, each of said bearing surfaces being provided with a supporting member and having a knife edge bearing element adapted to engage said bearing surface along a line of contact substantially at the shaft axis, the shaft projecting through said supporting member, one of said supporting members being provided with means adapted to engage cooperating means on the shaft whereby longitudinal movement of the shaft and the member relative to each other is prevented, this means being disposed intermediate the ends of the bearing surface associated with said supporting member, said means comprising interengaging grooved and ribbed portions on said shaft and said supporting member.

11. Bearing means for a rock shaft mechanism comprising a shaft provided with a plurality of spaced bearing surfaces disposed substantially axially of the shaft, each of said bearing elements being provided with a supporting member and having a knife edge bearing element adapted to engage said bearing surfaces along a line of contact substantially at the shaft axis, said knife edge bearing element being rockable on an axis substantially perpendicular to the axis of the shaft, one of said supporting members being provided with means to prevent longitudinal movement of the shaft relative to said member, said means comprising interengaging grooved and ribbed portions on said shaft and on said supporting member.

12. A rock shaft mechanism comprising a shaft, a pair of supporting housings, opposite end portions of the shaft projecting through the housings, a pair of knife edge bearing constructions comprising each a pair of cooperating knife edge bearing elements enclosed in a housing, one bearing element of each pair associated with the shaft and the other with the housing and the shaft associated element at one end only of the shaft being interlocked with the housing to permit relative oscillatory but prevent relative axial movement therewith in either direction, the interlocking being effected by circular ridges on the shaft associated element meshed with grooves on the housing associated element.

OSCAR U. ZERK.